United States Patent
Bischof et al.

(10) Patent No.: US 7,552,424 B1
(45) Date of Patent: *Jun. 23, 2009

(54) APPARATUS AND METHOD FOR IDENTIFYING A SYSTEM UNDER TEST

(75) Inventors: Joerg Bischof, Muehlhausen (DE); Horst Mueller, Schriesheim (DE); Jens Fichtner, Leipzig (DE)

(73) Assignee: SAP AG, Walldorf (DE)

( * ) Notice: Subject to any disclaimer, the term of this patent is extended or adjusted under 35 U.S.C. 154(b) by 343 days.

This patent is subject to a terminal disclaimer.

(21) Appl. No.: 10/680,350

(22) Filed: Oct. 6, 2003

(51) Int. Cl.
*G06F 9/44* (2006.01)
*G06F 11/00* (2006.01)

(52) U.S. Cl. .................. 717/127; 717/115; 717/124; 714/36; 714/37; 714/38; 714/39

(58) Field of Classification Search .................. None
See application file for complete search history.

(56) References Cited

U.S. PATENT DOCUMENTS

| | | | |
|---|---|---|---|
| 6,029,203 A * | 2/2000 | Bhatia et al. | 709/244 |
| 6,571,285 B1 * | 5/2003 | Groath et al. | 709/223 |
| 6,721,941 B1 * | 4/2004 | Morshed et al. | 717/127 |
| 7,124,401 B2 | 10/2006 | Mueller et al. | |
| 7,174,541 B2 | 2/2007 | Mueller et al. | |

* cited by examiner

*Primary Examiner*—Chuck Kendall
(74) *Attorney, Agent, or Firm*—Blakely, Sokoloff, Taylor & Zafman LLP

(57) ABSTRACT

A system and method for testing an application on a target system are described. The target system is assigned a logical name which is used by within a test script to reference the target system. The logical name is associated with a plurality of different communication channels within a system data container (e.g., remote function call ("RFC") channels, HyperText Transport Protocol ("HTTP") channels, . . . etc). During replay of the test script, a particular communication channel is selected from the plurality of communication channels based on the type of command within the test script that references the target system using the logical name.

23 Claims, 5 Drawing Sheets

APPARATUS AND METHOD FOR IDENTIFYING A SYSTEM UNDER TEST

BACKGROUND

1. Field of the Invention

This invention relates generally to the field of data processing systems. More particularly, the invention relates to a system and method for identifying a system under test.

2. Description of the Related Art

To ensure proper operation, software applications are generally tested before they are deployed, for example, within a network. In one approach to testing, known inputs are supplied to one instance of the application during execution to establish what the predicted proper outputs should be. The inputs and predicted outputs are stored within a test script. The test script may then be played back to test another instance of the application. For example, the same inputs may be applied to the other instance of the application and the resulting outputs may then be compared against the predicted outputs to determine whether the other instance of the application is functioning properly.

When features of an application are changed or enhanced to produce an updated application or a new application version, the testing process must be updated as well. In addition, because older versions of the application may continue to be used, the original test process must be maintained and used even though a new test process has been generated.

In a large enterprise network, tracking information associated with each of the different computer systems can be a difficult task. For example, the destination ports or other addresses for the various target systems may change (e.g., as the systems are upgraded). However, it is important to track this information if the applications residing at such systems are to be accessed, for example, for testing. In addition, test scripts must be updated to reflect these changes. Continually updating the system information stored within test scripts is an unduly burdensome task, particularly in a large enterprise network which may be comprised of hundreds of different target computer systems. Accordingly, a more efficient mechanism for maintaining information related to computer systems is needed.

SUMMARY

A system and method for testing an application on a target system are described. The target system is assigned a logical name which is used by a test script to reference the target system. The logical name is associated with a plurality of different communication channels within a system data container (e.g., remote function call ("RFC") channels, Hyper-Text Transport Protocol ("HTTP") channels, . . . etc). During replay of the test script, a particular communication channel is selected from the plurality of communication channels based on the type of command within the test script that references the target system using the logical name.

BRIEF DESCRIPTION OF THE DRAWINGS

A better understanding of the invention can be obtained from the following detailed description in conjunction with the following drawings, in which.

DETAILED DESCRIPTION OF PREFERRED EMBODIMENTS

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

EMBODIMENTS OF THE INVENTION

Figure 1:
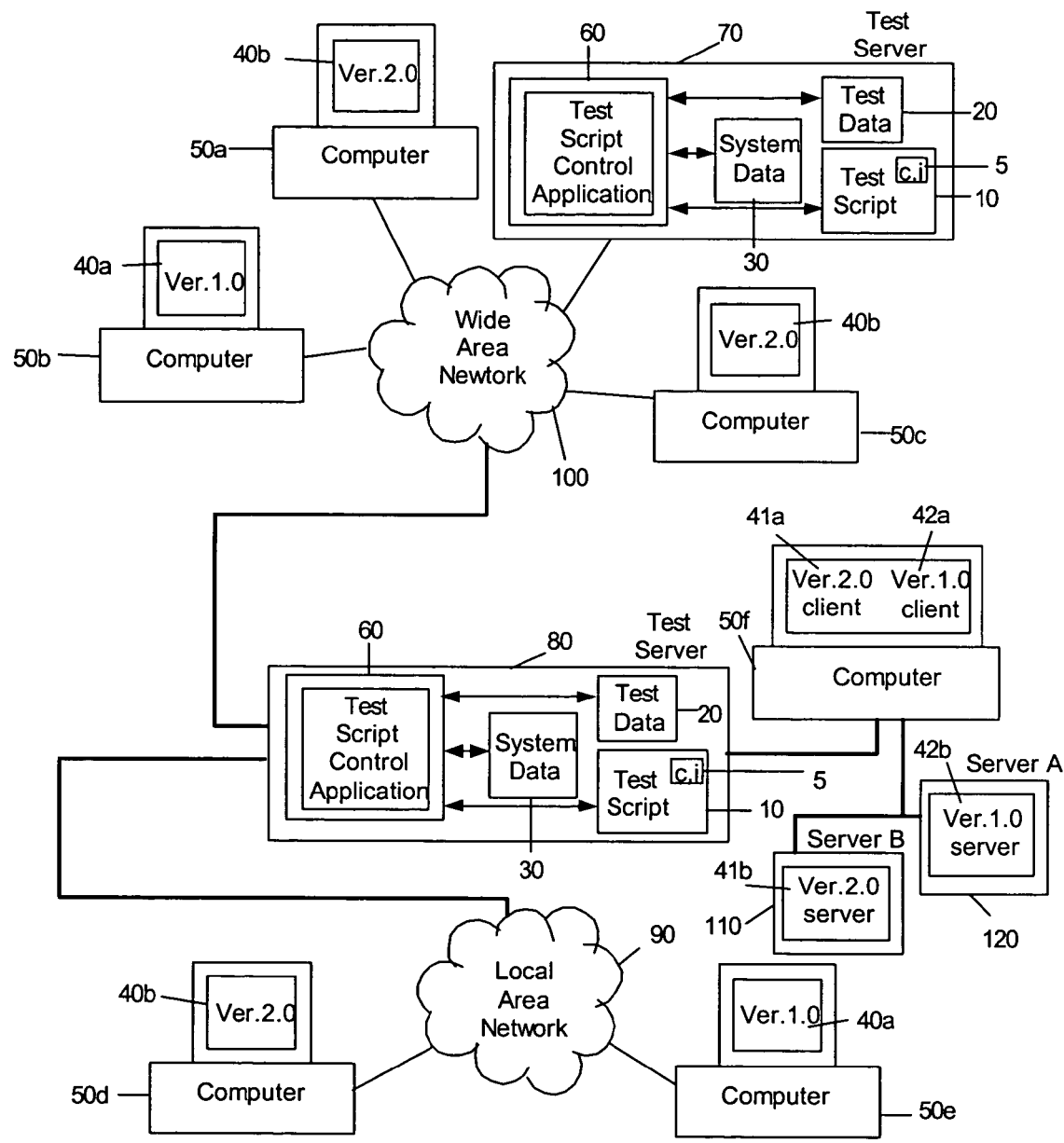
FIG. 1 is a block diagram of a server, a wide area network, and a local area network.

As shown in FIG. 1, a command interface 5 in accordance with the invention is included in a test script 10 resident on a test server 80 and may access test data 20 for testing applications 40a,b that are stored and executed on computers 50a–e. The command interface 5 may also be used to test an application that has a client part 41a executing on computer 50f and/or a server part 41b executing on server B 110, as well as an application that has a client part 42a executing on computer 50f and a server part 42b executing on server A 120. The test script 10 may be executed by a test script control application 60 stored on the remote test server 80 or on a local test server 70. The local test server 70 may test, for example, older versions of an application 40a or newer versions of the application 40b stored on the computers 50a–c. By connecting the computers 50a–f directly or through networks to the local and remote test servers 70, 80 the applications 40a, 40b may be tested over relatively short distances of a local area network ("LAN") 90 or over larger distances of a wide area network ("WAN") 100. Regardless of the distances, the command interface 5 included in the test script 10 allows test personnel to efficiently design, store, and execute the test script 10 for the various applications under test.

Figure 2:
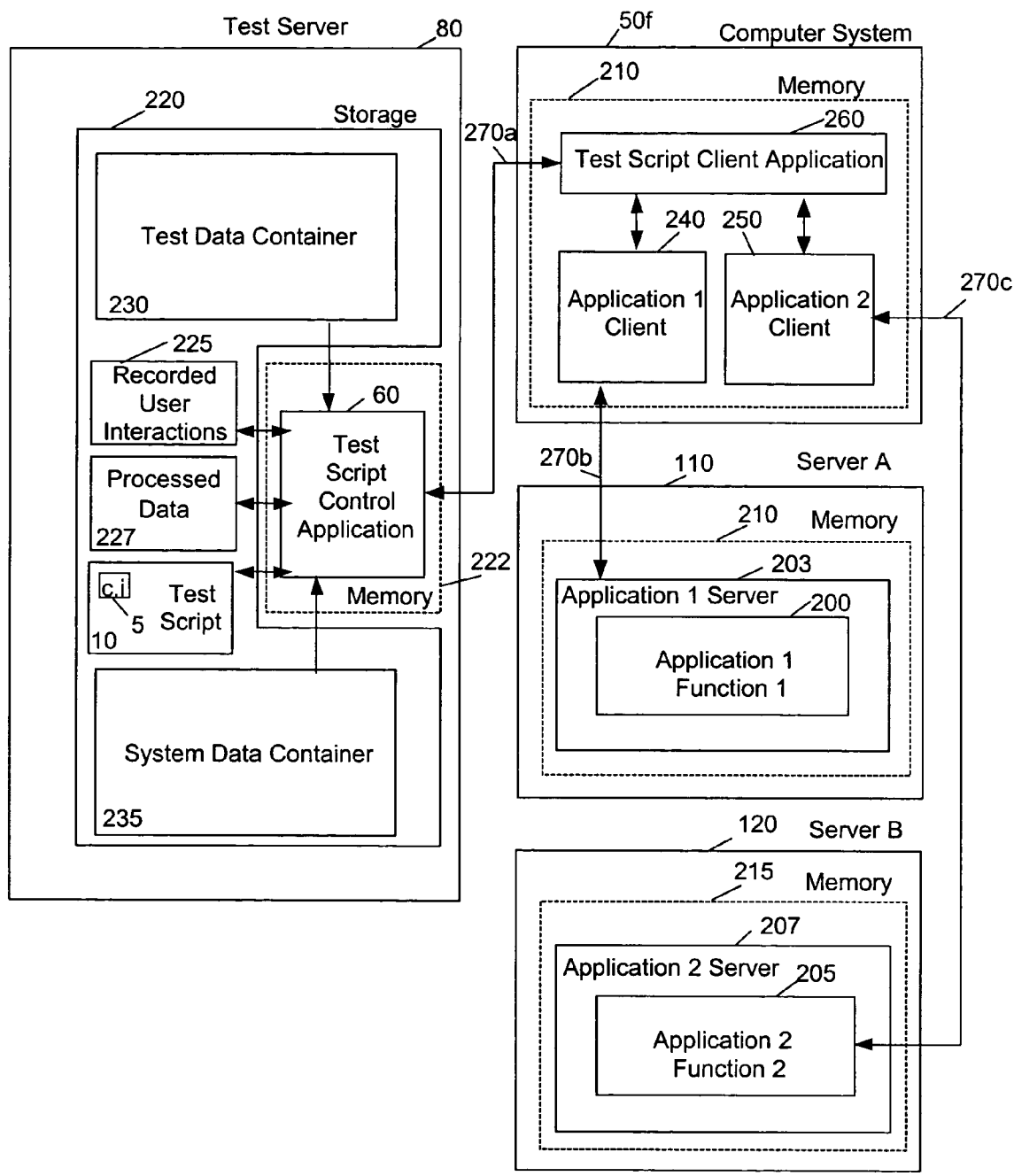
FIG. 2 is a block diagram of a server and two computer systems.

Referring to FIG. 2, in one embodiment, the test script 10, which includes the command interface 5, is created, stored, and executed by the test script control application 60, resident in memory 222 on test server 80, in order to test applications functions 1 and 2, 200 and 205, respectively, of respective application servers 1 and 2, 203 and 207, respectively, that reside in respective memories 210, 215 on server A 120 and server B 110. Application servers 1 and 2, 203 and 207, respectively, are accessed, for example, over respective communication media 270b, c (e.g., such as an Ethernet-based network) and interact with a user through respective application clients 1 and 2, 240 and 250, respectively, that reside in a memory 210 of computer system 50f. The application clients 240, 250 transfer data to and from a test script client application 260 (e.g., a plugin application) that transfers data to and from the test script control application 60. In some implementations the test script client application 260 records user-interactions 225, for use in test scripts, that occurred between a user and the application functions 1 and 2, 200 and 205, respectively, through the application clients 240 and 250, respectively.

Often, the test script 10 may be created by a test manager prior to testing and is stored in storage 220 on the test server 80. To create the test script 10, the test manager may review the previously recorded user interactions 225 that have been stored, for example, in storage 220. In some implementations, the previously recorded user interactions 225 may be incorporated into the test script 10 as known inputs for testing the application functions 1 and 2, 200 and 205, respectively.

To prepare for testing, a test manager recalls the test script 10 from the storage 220 and, if necessary, edits the test script using the test script control application 60. For example, the test manager may edit the command interface 5 in the test script 10 for the particular application under test. Next, the test manager causes the test script 10 to be executed, which causes the command interface 5 to pass input data to the application function under test.

The test script 10 may also use data stored in a system data container 235 to determine to which computer system to pass the input data. One particular embodiment of a system data container 235 is described below with respect to FIG. 3. The command interface 5 may also specify storage locations for returning processed data 227 from the application functions 200, 205 under test. Once returned, the processed data 227 may be compared to predetermined results to determine if the application functions are operating properly. The test data and the processed data may be retrieved and passed over communication media 270a that interconnects the test server 80 and the computer system 50f.

In general, to determine proper operation, the application functions 200, 205 may be executed more than once for various test scenarios. Typically, the various test scenarios are applied by calling the application functions 1 and 2, 200 and 205, respectively, multiple times. Each time one of the functions is called from the test script 10, for a test scenario, the command interface 5 passes different input data. However, increasing the amount of input data, due to the multiple function calls, increases the complexity of managing the input data within the test script 10. In addition, listing the multiple functions in the test script 10 may result in long repetitive test scripts.

To manage the large volume of input data due to the multiple function calls, the command interface 5 associated with each function call in the test script 10 may be used repetitively to access different input data for each of the test scenarios. By accessing the relevant input test data using a single command interface 5, the test script 10 is more condensed with fewer listings of repetitive test data and input parameters.

To execute the test scenarios, test personnel may also select which application to test. For example, test personnel may edit and execute the test script 10 for testing both application functions 1 and 2, 200 and 205, respectively. However, in another example, test personnel may configure the test script 10 to test the application function 1 200 on computer system 50f and not application function 2 205. After either or both of the application functions 200, 205 have been executed, data may be returned over the communication medium 270a for comparison testing with predetermined results or for comparison testing of the results from each application function.

Figure 3:
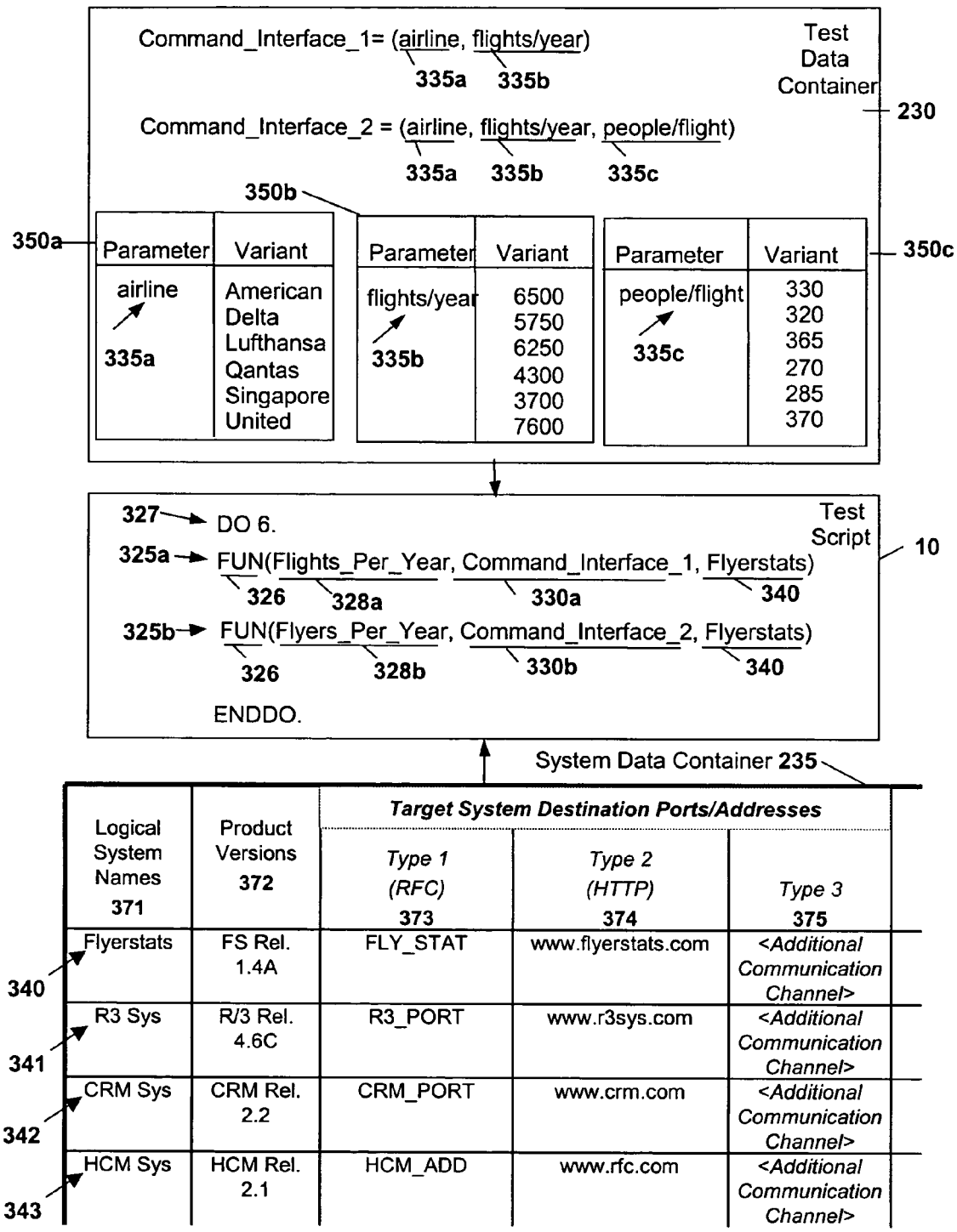
FIG. 3 is a diagram of a test script, a test data container, and a system data container to identify different communication channels for communicating with a system under test.

One embodiment of a test script 10 is illustrated in FIG. 3 that may test two application functions for multiple test scenarios by executing two respective function calls 325a, b. Each of the two function calls 325a, b includes a driver command 326 ("FUN" in the example) for executing respective application functions 328a, b. The two function calls 325a,b also include two respective command interfaces 330a,b that access data in a test data container 230 and a logical computer system name 340 that is interpreted according to computer system information stored in a system data container 235 (as described in detail below). As shown for example, the first function call 325a executes the function 328a named "Flights_Per_Year" and the second function call 325b executes the function 328b named "Flyers_Per_Year".

As shown in test data container 230, the command interface 330a corresponds to parameters 335a–b and the command interface 330 corresponds to parameters 335a–c. When the test script 10 is executed by the test script control application 60 (shown in FIGS. 1 and 2), the logical computer system name 340 identifies the computer system(s) where the respective application functions are resident by retrieving information in the system data container 235, and the command interfaces 330a, b are used to retrieve test data stored in the test data container 230, to transfer to the respective functions 328a, b. In one embodiment, the values used for the parameters 335a–c may be established from the information stored in the recorded user actions 225 (shown in FIG. 2).

The parameters 335a–c may, for example, represent a number of respective variants 350a–c, which may have been determined to be statistically significant user interactions with the application functions (e.g., based on previously-recorded user inputs). The variants 350a–c of the parameters 335a–c may be stored in the test data container 230 and may be passed individually by the command interfaces 330a, b to the functions 328a, b. For example, the parameter "airline" 335a includes six variants 350a listed in the test data container 230. Similarly the parameters "flights/year" 335b and "people/flight" 335c have corresponding variants 350b, c which may be individually passed by the command interfaces 330a, b during separate function calls.

In another example (not shown), a test script may directly assign values to parameters in command interfaces rather than reading values from the test data container 230. In the example in FIG. 3, the test script 10 includes a "Do" loop command 327 that executes the function calls 325a, b six times while the command interfaces 330a, b sequentially transfer a different variant of parameters 335a–c to the functions "Flights_Per_Year" and "Flyers_Per_Year" for each of the six loop executions. For example, the first time the first function call 325a is executed, the first variant 350a character string ("American") of the "airline" parameter 335a is fetched and the first variant 350b integer ("6500") of the "flights/year" parameter 335b is fetched. During the second execution of the "do" loop 327, the first function call 325a is executed a second time and the second variant 350a character string ("Delta") of the "airline" parameter 335a and the second variant 350b integer ("5750") of the "flights/year" parameter 335b are fetched.

As mentioned above, in one embodiment, information related to the computer systems on which the applications to be tested reside (hereinafter "target systems") is extracted from the system data container 235 using a logical system name. By way of example, in FIG. 3, both of the function calls 325a, b contain the "Flyerstats" logical system name 340 which identifies computer system information related to the "Flyerstats" target system contained in the system data container 235. In one embodiment, each logical system name (e.g., Flyerstats 340) is associated with a plurality of different destination communication channels 373–375, which specify a manner for locating and communicating with the target system on a network. Although the "communication channels" discussed throughout the remainder of this description will focus on network "ports" and/or "addresses" of target systems, various other types of communication channel information may be stored within the system data container 235 (e.g., the physical media access control ("MAC") address of the target systems).

In the particular example illustrated in FIG. 3, the "Flyerstats" logical system name 340 is associated with both a Remote Function Call ("RFC") destination port/address 373 ("FLY_STAT") and a Hypertext Transport Protocol ("HTTP") destination port/address 374 (www.flyerstats.com). Also illustrated in FIG. 3 are entries for an R3 system having the logical system name "R3 Sys" 341, an entry for a CRM system having the logical system name "CRM Sys" 342, and an entry for an HCM system having the logical system name "HCM Sys" 343. An indication of the system software version running on each of the target systems 340–343, is stored within column 372, an RFC address/port is provided within column 373 and an HTTP address/port is provided in column 374. Moreover, as indicated within column 375, various new addresses/port types may be associated with each target system and stored within the system data container 375. By way of example, and not limitation, these may include Web Services Description Language ("WSDL") ports, Simple Mail Transport Protocol ("SMTP") addresses/ports, and Remote Method Invocation ("RMI") ports, to name a few. It should be noted, however, that the underlying principles of the invention are not limited to any particular set of address/port types.

Although the test script 10 illustrated in FIG. 3 includes one specific type of driver command (i.e., the FUN command), various other types of driver commands may be recorded within the test script to test applications. The different driver commands may be configured to test the applications at different logical application layers including, for example, the user interface layer, the presentation layer, the business layer, and/or the database layer. In one embodiment, the test control application 60 selects a particular destination address/port from the system data container 235 based on the particular type of command included within the test script. For example, in one embodiment, in response to the FUN driver command, the test control application 60 chooses the RFC destination for calling function modules within the system under test. By contrast, in response to a command directed at the presentation layer of the system under test, the test control application 60 may select the HTTP destination port/address 374. In one embodiment, the presentation layer is enabled using Web Dynpro™ technologies designed by SAP AG, the assignee of the present application. By way of example, the driver used for testing the Web Dynpro-enabled presentation layer may use the following format: WEBDYNPRO (<cmd_para>, <testsys>), where <testsys> corresponds to the logical system name and <cmd_para> is a command interface identifying a set of parameters within the presentation layer (e.g., processed screens, UI elements, input field contents, triggered actions, . . . etc). Of course, the underlying principles of the invention are not limited to any particular set of commands and/or any particular set of addresses/port types.

Figure 4:
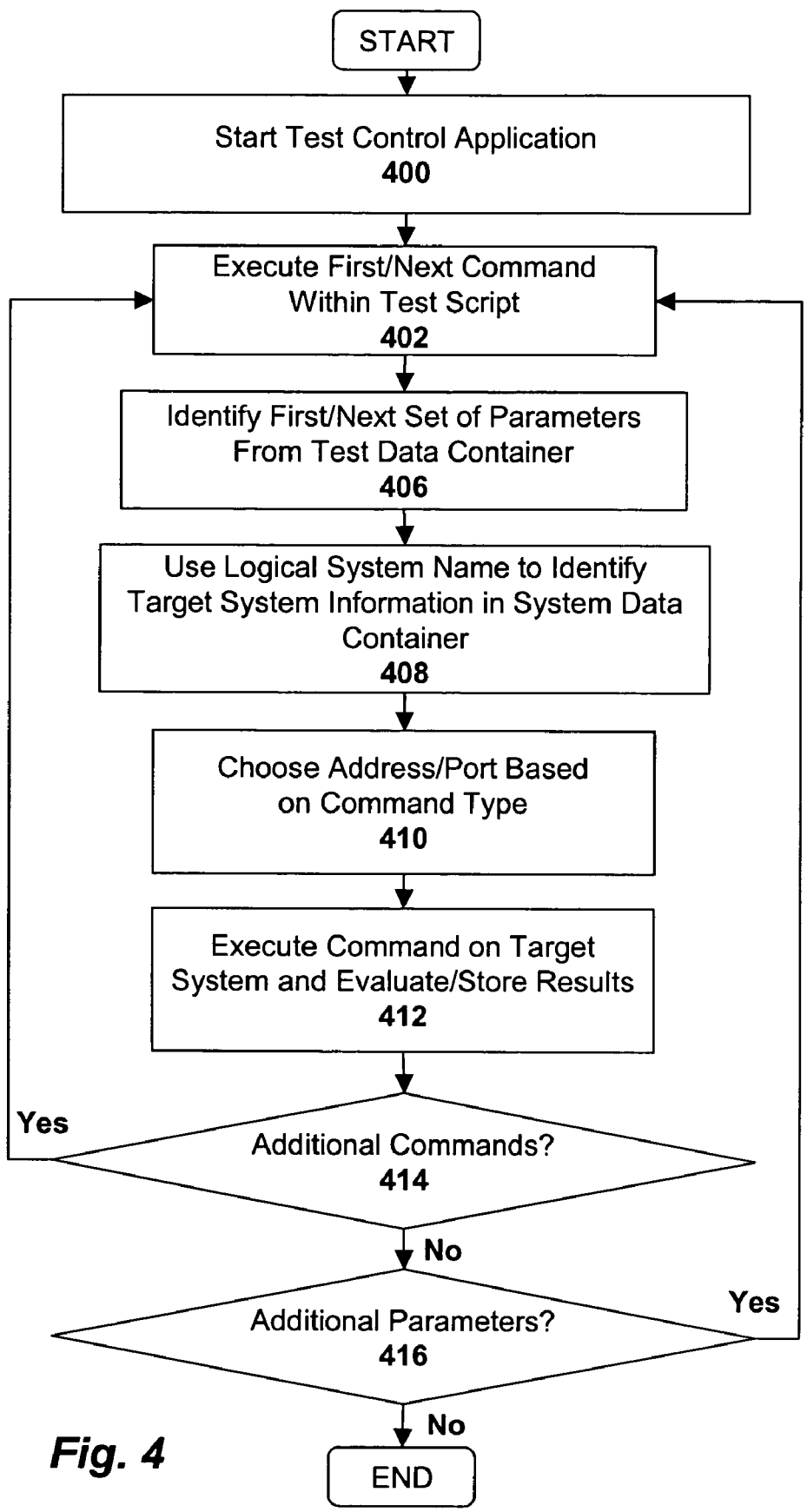
FIG. 4 illustrates a process according to one embodiment of the invention.

A method according to one embodiment of the invention is set forth in FIG. 4. At 400, the test control application is started. At 402, the test control application executes the first command within the test script (e.g., function call 325a). At 406, the first set of parameters are identified within the test data container. At 408, the logical system name associated with the command is used to access system information within the system data container. At 410, a particular address/port type is selected from the system data container based on the type of command being executed (e.g., the RFC port for "FUN" application function calls). At 412, the command is executed on the target system using the correct address/port type and first/next set of parameters. The results are then evaluated and/or stored. If any additional commands are left to be executed, determined at 414, then the process repeats from 402. If no additional commands are present within the test script, then at 416 a determination is made as to whether any of the same commands need to execute using additional parameters. If so, then the process repeats from 402 using the additional parameters. This process repeats until all parameters and/or commands are processed/executed. When no additional commands/parameters are contained within the test script, then the test process terminates.

By way of example, when test script 10 is executed, the first function call 325a executes the function "Flights_Per_Year" 328a and passes the first variant 350a character string ("American") of the "airline" parameter 335a, the first variant 350b integer ("6500") of the "flights/year" parameter 335b, and identifies the correct port/address to use to access the "Flyerstats" computer system from the system data container (e.g., the RFC port). After the first function call 325a is executed, the second function call 325b executes the function "Flyers_Per_Year" 328b and passes the first variant 350a character string ("American") of the "airline" parameter 335a, the first variant 350b integer ("6500") of the "flights/year" parameter 335b, the first variant 350c integer ("330") of the "people/flight" parameter 335c, and again identifies the correct port/address from the system data container 235. Thus, even through the second function call 325b requires additional data passed to the "Flyers_Per_Year" function 328b compared to the data passed to the "Flights_Per_Year" function 328a, the test script 10 remains relatively condensed since each function call 325a, b includes one respective command interface 330a, b.

In this example the "Do" loop 327 causes the first function call 325a to execute five more times for the five remaining variants 350a ("Delta", "Lufthansa", "Quantas", "Singapore", and "United") of the "airline" parameter 335a and the remaining five variants 350b ("5750", "6250", "4300", "3700", "7600") of the "flights/year" parameter 335b. The second function call 325b is also executed five more times for the five remaining variants 350a ("Delta", "Lufthansa", "Quantas", "Singapore", and "United") of the "airline" parameter 335a, the remaining five variants 350b ("5750", "6250", "4300", "3700", "7600") of the "flights/year" parameter 335b, and the remaining five variants 350c ("320", "365", "270", "285", "370") of the "people/flight" parameter 335c. Also, when executed, both function calls 325a,b continue to access the computer system using the port/address extracted from the system data container 235 (e.g., via the logical computer name "Flyerstats" 340).

Figure 5:
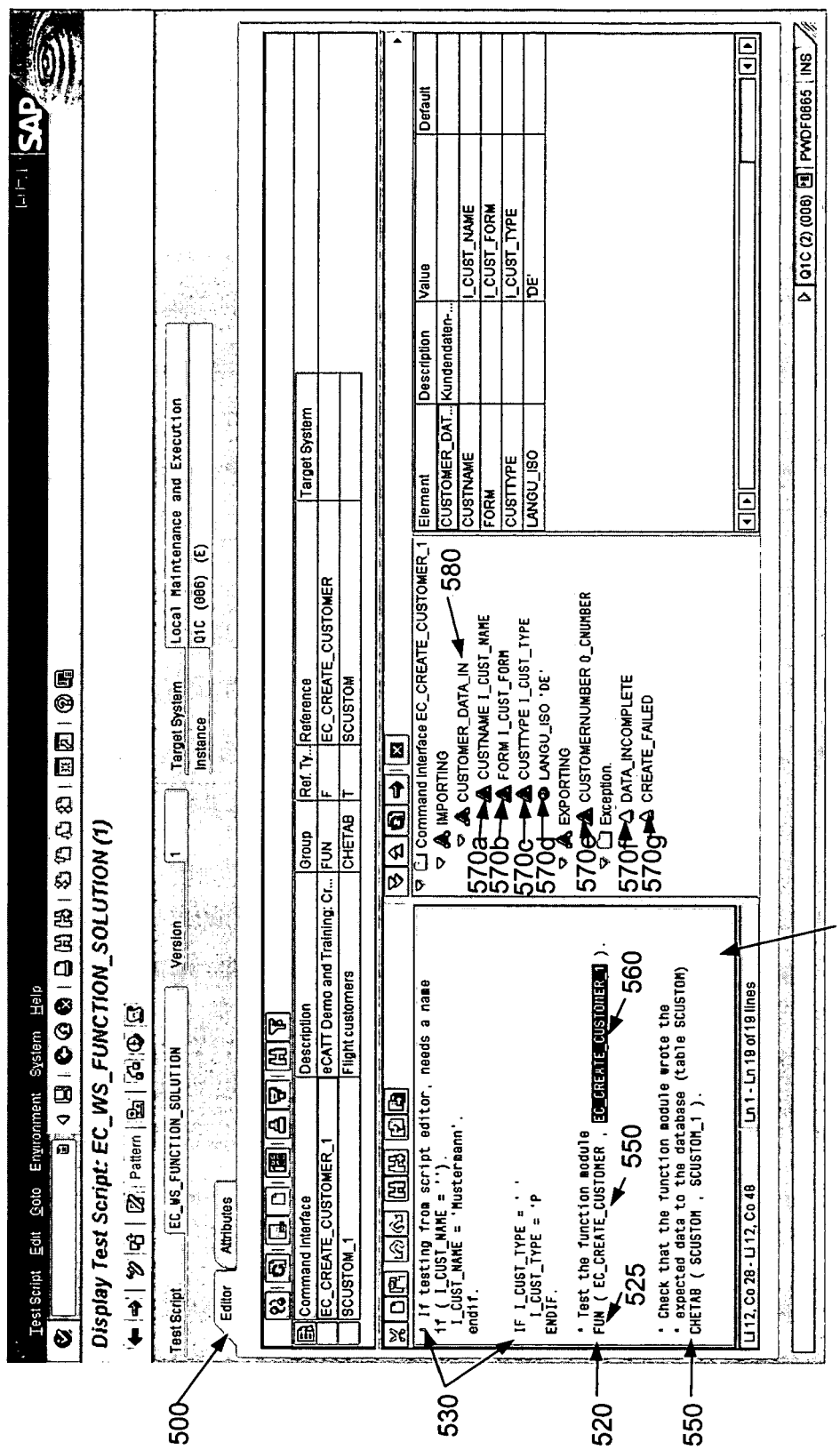
FIG. 5 illustrates a graphical test script editor employed in one embodiment of the invention.

Referring to FIG. 5, a test script control application 60 (shown in FIGS. 1 and 2) is exposed to the user through a browser window in the form of a test script editor 500. The test script editor 500 is shown accessing a test script 510 named EC_WS_FUNCTION_SOLUTION(1) which includes a function call 520, conditional commands 530, and a routine call 540 to determine if a function operated properly. The function call 520 uses a driver command "FUN" 525 to execute a function 550 named "EC_CREATE_CUSTOMER" with data passed from a command interface named "EC_CREATE_CUSTOMER_1" 560. In this example, the test script editor 500 also displays parameters 570a–g used by the command interface "EC_CREATE_CUSTOMER_1" 560 to import 570a–d and export 570e data to and from the application function "EC_CREATE_CUSTOMER" 550. The command interface 560 also includes parameters 570f, g for checking error flags in the application function 550. In this example, the import parameters 570a–d are combined into a single node 580 named "CUSTOMER_DATA_IN" which allows a test manager to efficiently insert the four importing parameters 570*a*–*d* into a command interface. Each of the parameters 570*a*–*g* may be assigned, for example, a string, a variable, a constant value, a condition value (e.g., "true" or "false"), or other similar structure.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, Flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, in the implementations discussed above, the test data container 230, the test script 10, and the system data container 235 were stored on the test server 80. However, in other implementations these items may be stored individually or in combination on one or more of the computer systems under test 50*a*–*f*, the servers A and B 110, 120, or on other similar digital storage systems. In another implementation, the application functions 200, 205 under test may be stored on the test server 80 or on other similar digital storage systems.

Moreover, the underlying principles of the invention may be implemented in a computing system that includes a back-end component, e.g., as a data server, or includes a middleware component, e.g., an application server, or includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

In addition, in one embodiment, the test script 10 is created in a flexible, platform-neutral computer language, such as extensible markup language (XML) to provide a test script that may be executed on various types of computer platforms. For example, the test script editor 500 shown in FIG. 5 may be capable of creating and editing XML test scripts.

In FIG. 3, variants 350*a* of the "airline" parameter 335*a* were character strings and the variants 350*b*, 350*c* of the "flights/year" parameter 335*b* and the "people/flight" parameter 335*c* were integers. However, in other implementations, variants may include, individually or in combination, short integers, long integers, short and/or long floating point numbers, arrays, pointers, structures, function calls, command interfaces, applications, or other similar data types. Parameters may also be of a fixed data type, such as one particular default value, which may be provided by the test data container 230, the test script 10, or entered by the test manager. Also, parameters and variants may include global variables and local variables.

In addition, in FIG. 3, test script 10 includes the command interfaces 330*a, b* which import data when the function calls 325*a,b* execute the functions "Flights_Per_Year" 328*a* and "Flyers_Per_Year" 328*b*. However, as shown in FIG. 4, the command interfaces 330*a,b* may also include parameters to export data from the functions, import and export data to and from the functions, pass error messages and flags between the test script and the function under test, or perform other similar information transfers. In another example, local and global variables may be transferred to the application functions by the command interfaces 330*a, b*.

Finally, in FIG. 3, the driver command "FUN" 326 executes the function calls 325*a*, 325*b* for testing the application functions 328*a*, 328*b*. However, the test script 10 may also include a driver command to execute object methods, test business application programming interfaces (BAPIs), application and database transactions, graphical user interfaces (GUIs), external applications which use certified interfaces, or other similar features of a software application. In such embodiments, a command interface may contain call content such as parameters to be passed to methods, fields to be passed to database management systems, or screens and other, possibly nested graphical components to be passed to a graphical presentation layer.

Accordingly, the scope and spirit of the invention should be judged in terms of the claims which follow.

What is claimed is:

1. A method for testing an application comprising:
   assigning a first logical name to a first target system,
   associating with the first logical name of the first target system a first communication channel and a second communication channel;
   executing a test script having one or more commands for testing the application;
   in response to encountering a first command within the test script that identifies the first target system with the first logical name, detecting a command type of the command, and selecting between the first communication channel and the second communication channel based on the detected type of command; and
   executing the first command on the application on the first target system using the selected communication channel.

2. The method as in claim 1 wherein the first communication channel comprises a remote function call ("RFC") communication channel and wherein the second communication channel comprises a hypertext transport protocol ("HTTP") communication channel.

3. The method as in claim 2 wherein the first command type a function call directed at a functional module of the application and wherein the first communication channel is selected in response to the function call.

4. The method as in claim 2 wherein the first command type is a presentation layer command directed at a presentation layer associated with the application and wherein the second communication channel is selected in response to the presentation layer command.

5. The method as in claim 1 further comprising:
   in response to encountering a second command within the test script that identifies the first target system with the first logical name, detecting a type of the second command, and selecting between the first communication channel and the second communication channel based on what type of command the second command is; and executing the second command on the application on the first target system using the selected communication channel.

6. The method as in claim 1 further comprising:

assigning a second logical name to a second target system, associating with the second logical name of the second target system a third communication channel and a fourth communication channel;

in response to encountering a second command within the test script that identifies the second target system with the second logical name, detecting what type of command the second command is, and selecting between the third communication channel and the fourth communication channel based on what type of command the second command is; and executing the second command on the application on the second target system using the selected communication channel.

7. The method as in claim 6 wherein the first communication channel is the same as the third communication channel and wherein the second communication channel is the same as the fourth communication channel.

8. A system including at least one processor comprising:

a test script to store one or more commands used to test applications residing on one or more target systems, the commands identifying the target systems using logical names associated with the target systems;

a system data container to associate each of the logical target system names with a plurality of communication channels for communicating with each of the target systems; and a test control program to execute the test script, and in response to encountering a first command within the test script that identifies a first target system with a first logical name, searching the system data container to select between a first communication channel and a second communication channel associated with the first logical name, the test control program selecting between the first communication channel and the second communication channel based on the first command type.

9. The system as in claim 8 wherein the test control program executes the first command on the application on the first target system using the selected communication channel.

10. The system as in claim 8 further comprising:

a test data container to store a plurality of parameters associated with each command, the test control program extracting the parameters from the test data container and executing each of the commands on the application a plurality of times using a different parameter for each execution.

11. The system as in claim 8 wherein the first communication channel comprises a remote function call ("RFC") communication channel and wherein the second communication channel comprises a hypertext transport protocol ("HTTP") communication channel.

12. The system as in claim 11 wherein the first command type a function call directed at a functional module of the application and wherein the first communication channel is selected in response to the function call.

13. The system as in claim 11 wherein the first command type is a presentation layer command directed at a presentation layer associated with the application and wherein the second communication channel is selected in response to the presentation layer command.

14. The system as in claim 8 wherein, the test control program, in response to encountering a second command within the test script that identifies the first target system with the first logical name, detecting the type of command that the second command is, and selecting between the first communication channel and the second communication channel from the system data container based on what type of command the second command is; and the test control program executing the second command on the application on the first target system using the selected communication channel.

15. The system as in claim 8 wherein, the test control program, in response to encountering a second command within the test script that identifies the second target system with the second logical name, detecting what type of command the second command is, and selecting between the third communication channel and the fourth communication channel from the system data container based on what type of command the second command is; and the test control program executing the second command on the application on the second target system using the selected communication channel.

16. The system as in claim 15 wherein the first communication channel is the same as the third communication channel and wherein the second communication channel is the same as the fourth communication channel.

17. An article of manufacture including program code which, when executed by a processor, cause the processor to perform the operations of:

assigning a first logical name to a first target system;

associating with the first logical name of the first target system a first communication channel and a second communication channel;

executing a test script having one or more commands for testing the application;

in response to encountering a first command within the test script that identifies the first target system with the first logical name, detecting a command type of the first command, and selecting between the first communication channel and the second communication channel based on the detected type of command; and executing the first command on the application on the first target system using the selected communication channel.

18. The article of manufacture as in claim 17 wherein the first communication channel comprises a remote function call ("RFC") communication channel and wherein the second communication channel comprises a hypertext transport protocol ("HTTP") communication channel.

19. The article of manufacture as in claim 18 wherein the first command type a function call directed at a functional module of the application and wherein the first communication channel is selected in response to the function call.

20. The article of manufacture as in claim 18 wherein the first command type is a presentation layer command directed at a presentation layer associated with the application and wherein the second communication channel is selected in response to the presentation layer command.

21. The article of manufacture as in claim 17 further comprising:

in response to encountering a second command within the test script that identifies the first target system with the first logical name, detecting the type of command that the second command is, and selecting between the first communication channel and the second communication channel based on the detected type of command that the second command is; and executing the second command on the application on the first target system using the selected communication channel.

22. The article of manufacture as in claim 17 further comprising:

assigning a second logical name to a second target system, associating with the second logical name of the second target system a third communication channel and a fourth communication channel;

in response to encountering a second command within the test script that identifies the second target system with the second logical name, detecting a command type of the second command, and selecting between the third communication channel and the fourth communication channel based on the detected type of command that the second command is; and executing the second command on the application on the second target system using the selected communication channel.

23. The article of manufacture as in claim 22 wherein the first communication channel is the same as the third communication channel and wherein the second communication channel is the same as the fourth communication channel.

\* \* \* \* \*